United States Patent
Liu et al.

(10) Patent No.: US 10,735,250 B2
(45) Date of Patent: Aug. 4, 2020

(54) DYNAMIC DISTRIBUTOR SELECTION FOR NETWORK LOAD BALANCING

(71) Applicant: International Business Machines Corporation, Armonk, NY (US)

(72) Inventors: Qi Ming Liu, Wuxi (CN); Yuan Yuan Zhang, WuXi (CN); Jian Hua Xia, Pudong New District (CN); Guo Chun Bian, Wuxi (CN)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 16/205,276

(22) Filed: Nov. 30, 2018

(65) Prior Publication Data

US 2020/0177674 A1 Jun. 4, 2020

(51) Int. Cl.
*H04L 12/24* (2006.01)
*H04L 29/12* (2006.01)
*H04L 29/08* (2006.01)

(52) U.S. Cl.
CPC ...... *H04L 41/0668* (2013.01); *H04L 41/0893* (2013.01); *H04L 61/2007* (2013.01); *H04L 67/02* (2013.01); *H04L 67/1008* (2013.01); *H04L 67/1031* (2013.01); *H04L 67/1034* (2013.01); *H04L 61/6022* (2013.01)

(58) Field of Classification Search
CPC ....... H04L 41/00; H04L 41/044; H04L 41/06; H04L 41/0654; H04L 41/0668; H04L 41/08; H04L 41/0803; H04L 41/0813; H04L 41/0816; H04L 41/0893; H04L 43/00; H04L 43/08–0823; H04L 47/00; H04L 47/10; H04L 61/00; H04L 61/2007; H04L 61/6022; H04L 67/00; H04L 67/02;
(Continued)

(56) References Cited

U.S. PATENT DOCUMENTS 7,756,924 B2 * 7/2010 Kaler .................. H04L 67/1059
709/204
7,881,208 B1 2/2011 Nosella
(Continued)

OTHER PUBLICATIONS

IBM, "Load Balancer Groups", downloaded from the Internet May 3, 2018, <https://www.ibm.com/support/knowledgecenter/SS9H2Y_7.5.0/com.ibm.dp.doc/lbg_loadbalancergroup.html>, 4 pages.

*Primary Examiner* — Michael A Keller
*Assistant Examiner* — Boris D Grijalva Lobos
(74) *Attorney, Agent, or Firm* — Andrew Aubert (57) ABSTRACT

A load balancer system having multiple load balancer machines working in parallel. At any given time, one of the load balancer machines is assigned to act as the current distributor that distributes web client communications and/or requests to the other load balancer machines in the load balancer system. However, these web client communications and/or requests are directed to a distributor module on all of the active, parallel load balancer machines in the system (for example, by the expedient of a common virtual IP address for layer 3/4 communications) in case the currently active distributor fails and one of the other active load balancer machines suddenly needs to take on the distributor role. In this way, web client communications are not lost when the current distributor machine fails.

20 Claims, 6 Drawing Sheets

(58) Field of Classification Search
CPC ....... H04L 61/10–1008; H04L 67/1031; H04L 67/1034
See application file for complete search history.

(56) References Cited

U.S. PATENT DOCUMENTS

| | | | |
|---|---|---|---|
| 9,553,809 B2* | 1/2017 | Sorenson, III | H04L 47/10 |
| 9,559,961 B1* | 1/2017 | Sorenson, III | H04L 43/00 |
| 2003/0005100 A1* | 1/2003 | Barnard | H04L 29/12113 709/223 |
| 2003/0140108 A1* | 7/2003 | Sampathkumar | H04L 29/06 709/208 |
| 2013/0332597 A1 | 12/2013 | Kumar | |
| 2016/0150000 A1 | 5/2016 | Yevmenkin | |
| 2016/0162301 A1* | 6/2016 | Fitzpatrick | G06F 9/4498 718/100 |
| 2016/0378526 A1 | 12/2016 | Venkataramaiah | |

* cited by examiner

DYNAMIC DISTRIBUTOR SELECTION FOR NETWORK LOAD BALANCING

BACKGROUND

The present invention relates generally to the field of Computer Network Management, and more particularly to load balancers.

One standard used to describe how computer systems interact across multiple "layers" of hardware and or machine language logic is the Open Systems Interconnection model (OSI model). The OSI model is a model that characterizes and standardizes the communication functions of a telecommunication or computing system without regard to its underlying internal structure and technology. The OSI model communication systems are partitioned into symbolic layers, with the original model defining seven layers.

Any particular layer is served by the layer below it and serves the layer above it. For example, a layer that provides encrypted communications across a network provides the path needed by applications above it, while calling the next lower layer to receive and send packets comprising the contents of that path. When there are two instances at the same "layer", the two instances are visualized with a horizontal connection between them in that layer.

The seven layers are: (i) physical; (ii) data link; (iii) network; (iv) transport; (v) session; (vi) presentation; and (vii) application. The physical layer (layer 1) is responsible for receiving and transmitting raw bit streams between components connected by physical mediums. The data link layer (layer 2) is responsible for reliably transmitting data frames between two nodes which are connected via a physical layer. The network layer (layer 3) communicates via packets and includes functionality for managing and structuring multi-node networks, including traffic control, addressing, and routing. The transport layer (layer 4) is responsible for reliable transmission of data segments between points on a network, including multiplexing, segmentation and acknowledgement. The session layer (layer 5) is responsible for management of communication sessions, such as uninterrupted exchanges of information in the form of bi-directional transmissions between two nodes. The presentation layer (layer 6) is responsible for translating data between networking services and applications, including compression, decryption/encryption, and character encoding. Finally, the application layer (layer 7) is responsible for resource sharing, remote file access, and other types of high-level application programming interfaces (API).

In computing, load balancing is a technique for improving distribution of workloads across multiple computing resources, for example, computers, a computer cluster, network links, central processing units, or disk drives. One objective of load balancing is for maximized throughput, minimized response time, optimized resource use, and avoidance of overloading of any single given resource. Usage of multiple load balancing components instead of a single component can increase availability and reliability via redundancy. Load balancing typically involves dedicated software or hardware, such as a Domain Name System server process or a multilayer switch.

SUMMARY

According to an aspect of the present invention, there is a method, computer program product and/or system performing load balancing operations in conjunction with a plurality of web client devices and a plurality of hypertext transfer protocol (HTTP) servers that performs the following operations (not necessarily in the following order): (i) a plurality of non-initial distributor role load balancer machines (LBMs); (ii) an initial distributor role LBM; (iii) a distributor fail detection module structured, programmed and/or connected in data communication to detect a failure in the initial distributor role LBM; and (iv) a new distributor role assignment module structured, programmed and/or connected in data communication to, responsive to the detection of the failure in the initial distributor role LBM, assign a first non-initial distributor role LBM of the plurality of non-initial distributor role LBMs to act in the distributor role on a going forward basis. The initial distributor role LBM includes: (i) a distributor module, and (ii) a load balancer module. Each load balancer machine of the plurality of non-initial distributor role LBMs includes: (i) a distributor module, and (ii) a load balancer module. The initial distributor role LBM is assigned: (i) a common logical network address, and (ii) a unique logical network address. Each load balancer machine of the plurality of non-initial distributor role LBMs is assigned: (i) a common logical network address, and (ii) a unique logical network address. The distributor module of the initial distributor role LBM is structured, programmed and/or connected in data communication to receive, at the common logical network address, a plurality of web client communications from the plurality of web client devices over a communication network. The distributor module of each load balancer machine of the plurality of non-initial distributor role LBMs is structured, programmed and/or connected in data communication to receive, at the common logical network address, the plurality of web client communications from the plurality of web client devices over the communication network. The distributor module of the initial distributor role LBM is further structured, programmed and/or connected in data communication to, as part of its assigned distributor role, distribute each given web client communication of the plurality of web client communications to one of the following: (i) the load balancer module of the initial distributor role LBM, or (ii) the load balancer module of one of the non-initial distributor role LBMs using the unique logical network address associated with that non-initial distributor LBM. The load balancer module of the initial distributor LBM and the load balancer modules of the non-initial distributor LBMs are structured, programmed and/or connected to perform load balancing with respect to the plurality of web client communications distributed by the distributor module of the initial distributor LBM and the plurality of HTTP servers.

According to an aspect of the present invention, there is a method, computer program product and/or system that performs the following operations (not necessarily in the following order): (i) assigning a common logical network address to a plurality of load balancer machines (LBM) of a load balancer system; (ii) for each given LBM of the plurality of LBMs, assigning a unique logical network address to the given LBM; (iii) assigning a first LBM of the plurality of LBMs to a distributor role such that the LBMs of the plurality of LBMs other than the first LBM take on a non-distributor role; (iv) receiving, by the load balancer system, from a plurality of web client devices and over a communication network, a plurality of incoming web client communications, with the receipt of the plurality of incoming web client communications including: (a) receiving, by the first LBM and at the common logical network address, the plurality of incoming web client communications, (b) receiving, by the non-distributor role LBMs and at the common logical network address, the plurality of incoming web client communications, and (c) at least temporarily saving, by the non-distributor role LBMs the plurality of incoming web client communications; (v) distributing, by the first LBM, some of the incoming the plurality of incoming web client communications using the unique logical network addresses respectively corresponding to the non-distributor role LBMs, with the incoming web client communications of the plurality of incoming web client communications that are not distributed forming a plurality of not-yet-distributed communications; (vi) determining that the first LBM has failed; and (vii) responsive to the determination that the first LBM has failed, assigning a second LBM of the plurality of LBMs to the distributor role such that the LBMs of the plurality of LBMs other than the first and second LBMs maintain their respective non-distributor roles.

DETAILED DESCRIPTION

Some embodiments of the present invention are directed to a load balancer system having multiple load balancer machines working in parallel. At any given time, one of the load balancer machines is assigned to act as the current distributor that distributes web client communications and/or requests to the other load balancer machines in the load balancer system. However, these web client communications and/or requests are directed to a distributor module on all of the active, parallel load balancer machines in the system (for example, by the expedient of a common virtual IP address for layer 3/4 communications) in case the currently active distributor fails and one of the other active load balancer machines suddenly needs to take on the distributor role. In this way, web client communications are not lost when the current distributor machine fails. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
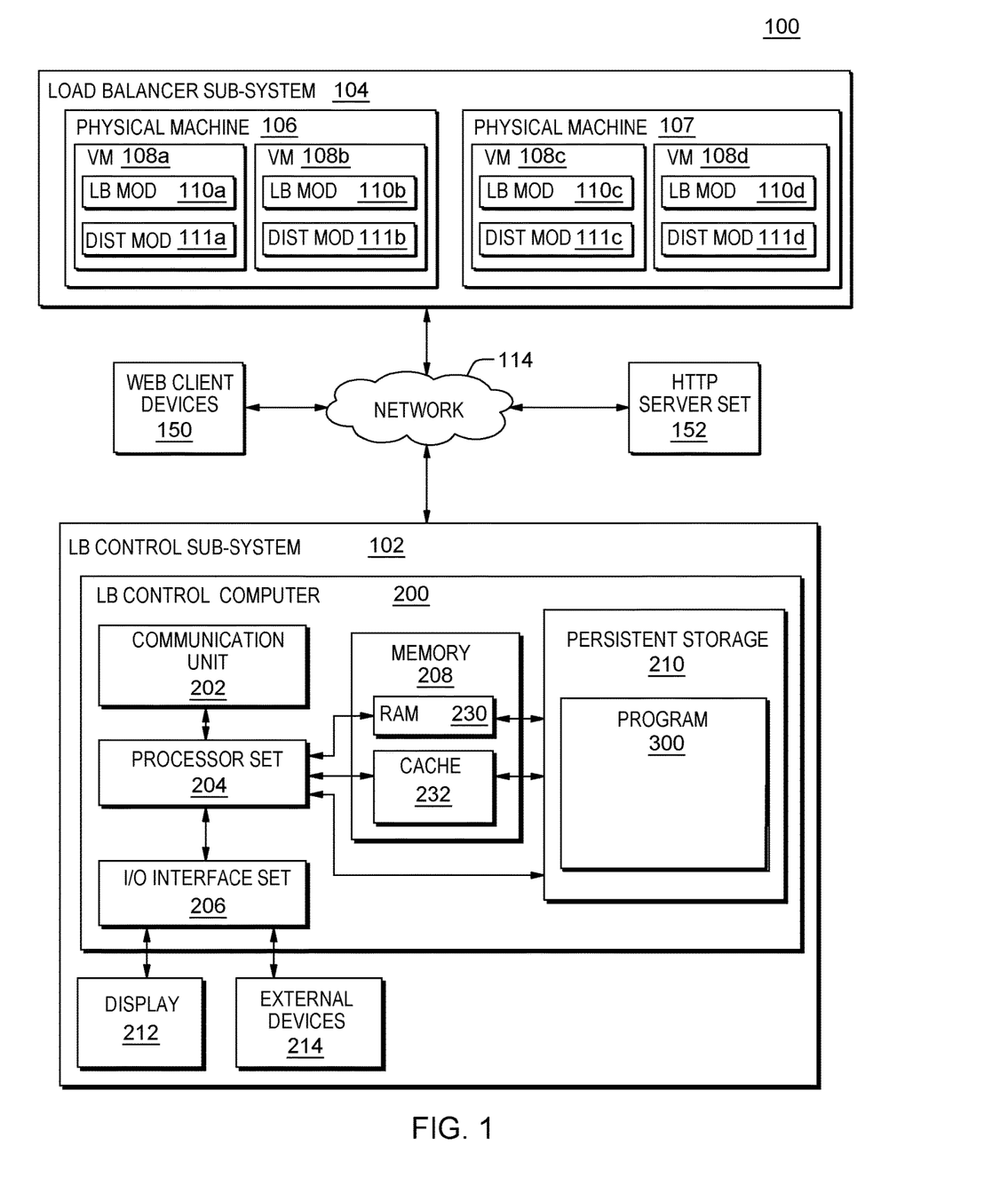
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: load balancer control sub-system 102; load balancer sub-system 104; web client devices set 150; communication network 114; and HTTP (hypertext transfer protocol) server set 152. Load balancer control sub-system 102 includes: load balancer control computer 200; communication unit 202; processor set 204; input/output (I/O) interface set 206; memory device 208; persistent storage device 210; display device 212; external device set 214; random access memory (RAM) devices 230; cache memory device 232; and program 300. Load balancer sub-system 104 includes physical machine 106 and physical machine 107. Physical machine 106 includes: virtual machine (VM) 108a and VM 108b. Physical machine 107 includes: virtual machine (VM) 108c and VM 108d. The VMs 108a,b,c,d includes: load balancer modules 110a,b,c,d and distributor modules 111a,b,c,d.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
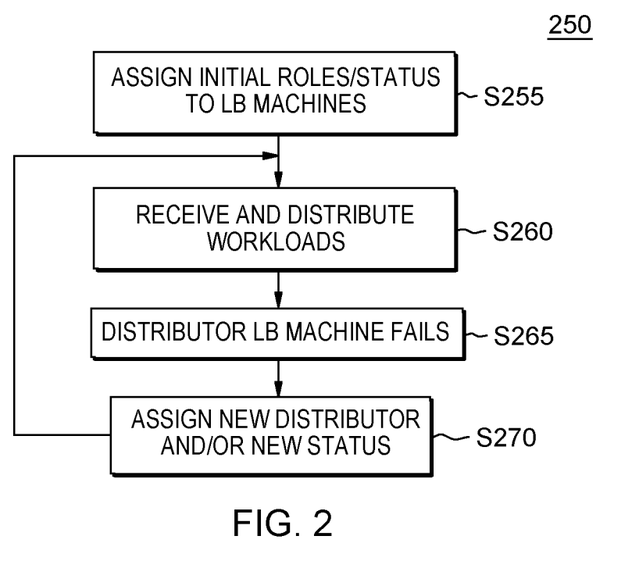
FIG. 2 is a flowchart showing a first embodiment method performed, at least in part, by the first embodiment system.
Figure 3:
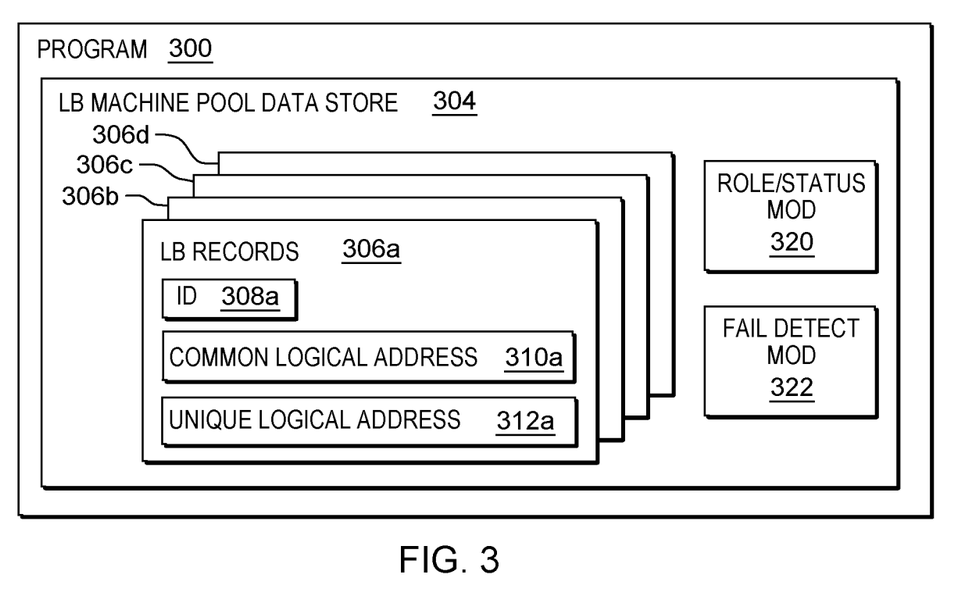
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where role/status module ("mod") 320: (i) assigns VM 108a (one of the four load balancer machines in this embodiment) of physical machine 106 of load balancer sub-system 104 to a distributor role; (ii) assigns VM 108b (one of the four load balancer machines in this embodiment) of physical machine 106 of load balancer sub-system 104 as having an inactive status; (iii) assigns VM 108c (one of the four load balancer machines in this embodiment) of physical machine 107 of load balancer sub-system 104 as an active "worker" machine; and (iv) assigns VM 108d (one of the four load balancer machines in this embodiment) of physical machine 107 of load balancer sub-system 104 as an active "worker" machine (see FIG. 1 and screenshot 400 of FIG. 4 (see listing of component machines at time T0)).

More specifically, mod 320 makes its assignment with reference to the load balancer (LB) machine pool data store 304, which is a data store that stores information about all the LB machines systemwide in load balancer sub-system 104. In this embodiment, and at time T0, there are four (4) machines in the pool, but only three of them are active (in this example, at time T0, VM 108b has been experiencing some problems that are being patched). Even more specifically, in this embodiment, each LB machine 108a,b,c,d has a respectively corresponding LB machine (LBM) record 306a,b,c,d. Each LBM record includes the following data fields: (i) identification number 308a,b,c,d (in this example, PM-VM1, PM-VM2, PM2-VM1 and PM2 -VM2 for load balancer VMs 108a,b,c,d, respectively); (ii) common logical address 310a,b,c,d (the use of the common logical address will be explained in more detail, below, in connection with operation S260); and (iii) unique logical address 312a,b,c,d (the use of the unique logical addresses will be explained in more detail, below, in connection with operation S260).

While in this embodiment, the various LBMs are tracked by LBM pool data store 304 and role/status mod 320 of LB control computer 200 (see FIG. 1), alternatively the LBMs could be tracked by one, or more, of the computers of LB sub-system 104. In this example, the LBMs all take the form of VMs. Alternatively, each load balancer could correspond to a single physical computer machine (for example, a server computer running LINUX Director).

Processing proceeds to operation S260, where web client devices 150, network 114, LB sub-system 104 and HTTP server set work together co-operatively to receive and distribute work loads. The web client devices send work loads, and/or other web client communications related to performing work loads to HTTP server set 152 through LB sub-system 104, as is done in currently conventional systems for using load balancers to distribute work loads, coming from multiple web client devices, among and between a set of HTTP servers. However, load balancer sub-system 104 operates differently than currently conventional multiple load balancer systems as will now be explained in the following paragraphs.

Figure 4:
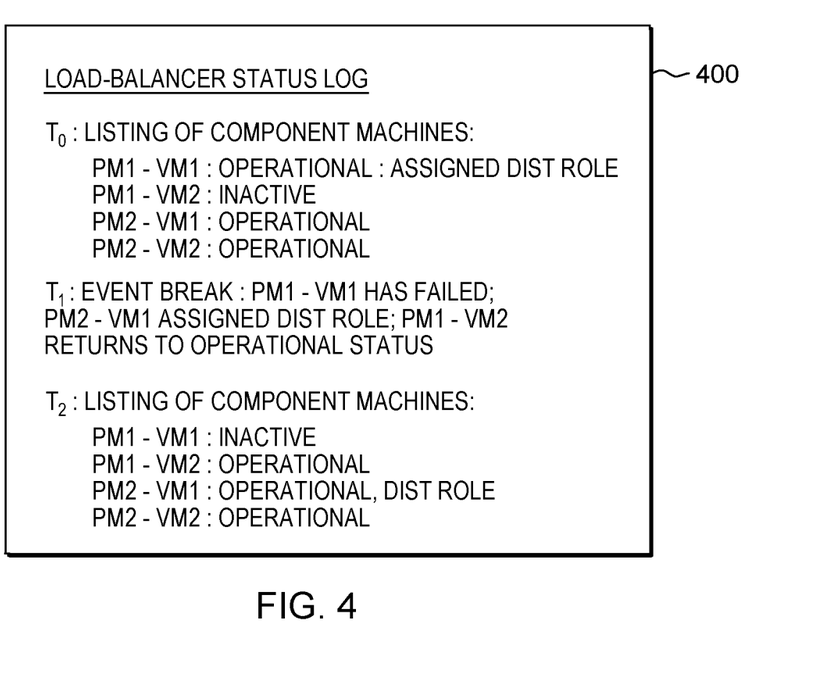
FIG. 4 is a screenshot view generated by the first embodiment system.

In LB sub-system 108, all of the active LB machines (in this case, and at the time immediately after T0, that would be VMs 108a,c,d—see FIG. 4 for PM1-VM1, PM 2-VM1 and PM2-VM2) use a common logical network address to receive communications from the web client devices through network 114. As will be explained in detail in the following sub-section of this Detailed Description section, this common logical address may take the form of a virtual IP address for receiving communications at levels 3 and/or 4. More specifically, all of the active LB machines receive web client communications, using this common logical network address at their respective distributor mods 111a,c,d (see FIG. 1). However, only one of these distributor mods, specifically the distributor mod of the LB machine assigned to the current distributor role. In this case and at the times immediately after T0, VM 108a is assigned as the current distributor (see FIG. 4 for PM1-VM1), meaning that only distributor mod 111a acts upon the incoming web client device communication. The distributor mods of the other active LB machines (that is, distributor mods 111c and 111d) merely temporarily store these incoming requests for use in the case that the current distributor fails (as will be further explained, below, in connection with operations S265 and S270).

During the normal operations of the LB sub-system that occur during operation S260, current distributor mod 111a distributes the incoming web client device communications to one of the following destinations: (i) LB mod 110a; (ii) LB mod 110c; or (iii) LB mod 110d. These communications cannot use the common logical network address precisely because this address is the same across all of the active LB machines (VMs 108a,c,d) in LB sub-system 104. In order to direct these incoming web client device communications, a unique logical network address assigned to each active LB machine is used (see FIG. 3 at unique logical address 312a). As will be discussed in detail in the following sub-section of this Detailed Description section, this unique logical network address may take the form of a media access control (MAC) address that is uniquely assigned to each LB machine and receives communications at level 2. In this example and at times immediately after T0, the LB machine VM 108b may have a unique logical network address assigned to it, but it will not receive any incoming web client device communications because it is in inactive status (see FIG. 4).

Processing proceeds to operation S265 where VM 108a (the currently assigned distributor machine) fails (that is, actually stops operating, or operates in a manner that indicates it may soon stop operating) at time T1. This failure is detected by fail detect mod 322.

Processing proceeds to operation S270 (performed at time T2), where, in response to detection of the failure at operation S265, role/status mod 320 assigns a new current distributor machine from among the other active LB machines in LB sub-system 104. As shown in FIG. 4 (see PM2-VM1 under T2: LISTING OF COMPONENT MACHINES"), in this example, role/status mod 320 assigns VM 108c (having id number PM2-VM1) to the current distributor role. In this embodiment, role/status mod 320 chooses the new distributor machine based upon which eligible LB machine has been operating, without failure, for the longest time and chooses PM2-VM1 on that basis. Alternatively, there are other types of machine logic based rules that may be used to choose a new LB machine for the distributor role, and some of these may be discussed in more detail in the following sub-section of this Detailed Description section. At time T1, mod 320 also determines that VM 108b (having id number PM1-VM2 is ready to go back into active service as a load balancer machine (see FIG. 4), and the new distributor LB machine 108c receives the information that: (i) VM 108a (id number PM1-VM1) is now inactive; and (ii) VM 108b (PM1-VM2) is now active.

After time T2, processing loops back to operation S260 and operations recommence with the new distributor (specifically, VM 108c, id number PM2-VM1) and a somewhat different set of active LB machines (specifically, VMs 108b,c,d, with id numbers PM1-VM2, PM2-VM1 and PM2-VM2, respectively). One important feature of this embodiment is that the distributor module 111c of the new distributor machine VM 108c had been receiving incoming communications from the web client devices since a time prior to time T1 (when previous distributor 108a failed). These were received by distributor mod 111c at the common logical network address, and are now distributed by mod 111c so that the fail over is seamless, meaning that no communications are lost due to the failure of previous distributor 111a. In some embodiments, this seamless failover is an important advantage relative to the currently conventional art of multiple load balancer machine load balancer systems. Normal load balancer operations will continue under operation S260 until there is a failure of the new distributor VM 108c, or until there is another status change (for example, a replacement VM for failed VM 108a is instantiated and is ready to become active).

As mentioned above, the new distributor machine VM 108c had been receiving incoming communications from the web client devices since a time prior to time T1, and has been saving those, at least temporarily. The other active non-distributor role LBMs have likewise been receiving and saving these incoming communications. In different embodiments, the amount and/or length of time that these incoming web client communications are saved will vary depending upon design choice. For example, some embodiments may save incoming web client communications according to a time window, measured backwards from a present time, discarding web client communications as they become stale and "fall out of the time window." As a different example, some embodiments may save a predetermined number of the most recent web client communications, discarding web client communications when the number saved goes over the predetermined threshold number of communications to save. The bottom line is that the distributor mods of the non-distributor role LBMs should save sufficient incoming web client communications to reliably provide for seamless failover of the distributor role based upon how the given embodiment operates (for example, how busy it tends to be with a rate of incoming web client communications).

III. Further Comments and/or Embodiments

Some embodiments of the present invention recognize the following facts, potential problems and/or potential areas for improvement with respect to the current state of the art: (i) to avoid single point of failure into a system, it is common to have two load balancers (like Linux director) in an active/standby configuration; (ii) in this scenario, the active Linux director accepts packets for the service and forwards them to the real servers; (iii) the standby Linux director is idle which is arguably a waste of resources; (iv) self-balancing is an option that allows an interface in a standby group to participate in connection distribution for load-balancing; (v) the active member distributes incoming connections among all self-balancing members; (vi) all incoming packets for connections that are addressed to a Virtual Internet Protocol (VIP) address are delivered to the active member; (vii) the active member decides which of the other members should process each connection and forwards all packets for this connection to this member for processing; (viii) the member that processes the connection responds directly to the client; (ix) when an active member fails (hardware/software failure, power off, system updating), control of the standby group moves to the interface of a different member which becomes the active member; (x)

however, all TCP connections to the virtual IP address are interrupted; and/or (xi) TCP connections must be recovered, are delayed during that process, and some might be lost.

Some embodiments of the present invention may include one, or more, of the following features, characteristics and/or advantages: (i) have all load balancers and the distributor configured with same virtual IP address; (ii) the distributor role works as master, which is elected from the load balancer group, it distributes traffic to a load balancer (role as worker) after changing the destination Media Access Control (MAC) address to the load balancer's MAC address; (iii) the destination MAC address change happens on layer 2, so it is possible that no TCP connections to the virtual IP address are broken; (iv) there is a HEHALB (High Elastic High Availability Load Balancing) protocol running among all load balancers; (v) with HEHALB protocol interacting, master can monitor the status of workers, configure weight of workers dynamically, and so on; (vi) a focus of some embodiments of the present invention is to distribute traffic to multiple load balancers in layer level 2, while taking Distributor Selection, ARP response and Mapping Policy into consideration; (vii) the distributor works in layer 2 eliminating any need to keep layer 3/4 information such as TCP session information, enabling support of more load balancers with one distributor; (viii) distribution works through a destination MAC address change in layer 2, and there is no break with layer 3/4, so it is possible that there is no TCP connections interrupted to the virtual IP address during the distributor failover; and/or (ix) the disclosure supports high availability through distributor preemption and traffic distribution as well as changing the weight of backend load balancers dynamically.

Some embodiments of the present invention may include one, or more, of the following features, characteristics and/or advantages: (i) distributor selection is sometimes called master election; (ii) there is a HEHALB (High Elastic High Availability Load Balancing) protocol running among all load balancers; (iii) HEHALB protocol includes 4 kinds of messages; (iv) all HEHALB protocol messages are UDP packets; (v) one message, a heartbeat check (HC), is broadcasted periodically (for example, every 2 seconds) from the load balancer (LB) distributor (master) to workers to inform the configuration change of LB workers and current active and inactive workers; (vi) the payload for a HC message includes four categories of information: (a) a type, which includes an integer of 0 to indicate a HC message, (b) active LB workers, which includes a list of string data type including a list of IP addresses for active LB workers, as each worker LB must be aware of all current active worker LB s in the event that the current master LB experiences failure, (c) inactive LB workers, which includes a list of string data type including a list of all inactive LB workers, and (d) configuration updating, which includes a data type of string including an updated configuration for the worker LB if there is one, or a value of void if there is no updated configuration; (vii) another message, a heartbeat response (HR), is sent from worker LB to master LB in response to an HC message; (viii) the payload for a HR message includes four categories of information: (a) a type, which includes an integer of 1 to indicate a HR message, (b) inactive status, (c) capability, and (d) load; (ix) another message is an activation message, sent from the master LB to a worker LB to activate the worker LB; and/or (x) a deactivation message is sent from the master LB to a worker LB to deactivate the worker LB.

Some embodiments of the present invention may include one, or more, of the following features, characteristics and/or advantages: (i) an LB configuration sync up: (a) an agent in the master LB (distributor) will be the single point for LB configuration updating, (b) when there is an LB configuration change a HC message will reflect the change and broadcast the change to all worker LB, and (c) active and inactive worker LB update to the configuration change using the HC; (ii) worker load report and dynamic LB load balancing: (a) the worker LB load changed over time, (b) each time when the master LB receives the load of each worker LB the master LB will try to reset the weight of each worker LB by the load of the worker LB, and (c) the worker LB weight reset is dynamic and will not impact any existing sessions; (iii) dead (inactive) worker monitoring includes that the master LB will remove a worker LB from the active LB list if the master LB cannot receive a HR message from a worker LB; (iv) new master LB election when the current master LB is down: (a) when the master LB is down there will be no HC messages sent to worker LB, (b) each worker LB broadcasts their own HR message to each other worker LB, (c) all active worker LB compare received HR messages to determine priority of which worker LB is elected the next master LB, (d) priority is calculated using the following equation:

$$Priority = 0.8 * Capability - 0.2 * Load$$

(e) if a worker LB determines that another worker LB has a higher priority it will do nothing, (f) if a worker LB is unable to determine that another worker LB has a higher priority it will become the new master LB, (g) the new master LB will start to broadcast HC messages to the worker LB, and (h) the weight of each worker LB and the active/inactive worker LB list can be retrieved from HC messages sent from the previous master LB; and (v) inactive LB activation for high system load: (a) the master LB detects that the whole system load is too high and that there are inactive worker LB available, (b) the master LB sends an activation message to one or more inactive worker LB to activate the inactive worker LB, and (c) when an inactive worker LB receives the activation message from the master LB it will change its state to active and start sending HR messages to the master LB with the field Inactive set to false.

Some embodiments of the present invention may include one, or more, of the following features, characteristics and/or advantages: (i) distributor selection happens on initial phase and failover, and distributor selection when failover has been described in 'New master election when master down' section in previous; (ii) it is similar for distributor selection during initial phase since there is no HC message received by workers LB (iii) with regard to ARP response, each IP address in use on the network is present on a single host and each MAC address is present on a single host; (iv) when an ARP request is sent for the MAC address of an IP address that is present on the network, a single reply is received from the host that owns that IP address, with its MAC address; (v) now the distributor (master) and workers (load balancers) share the same IP address; (vi) only the distributor can reply the ARP response while others can't reply; (vii) with regard to mapping policy, there is mapping policy for the distributor to follow to distribute the traffic; (viii) usually data packets can be differentiated by (src IP, src Port, Protocol ID), and are used to map to certain worker (backend load balancer); (ix) the mapping policy is synchronized in 'Configuration Updating' in the HC message payload; (x) when the old distributor failover, the new distributor can take over seamlessly since it already has the mapping policy; and (xi) usually, the master doesn't take a role as worker unless it just becomes master and still have active sessions, and it is suggested to keep the session until timeout of the existing sessions.

Figure 5:
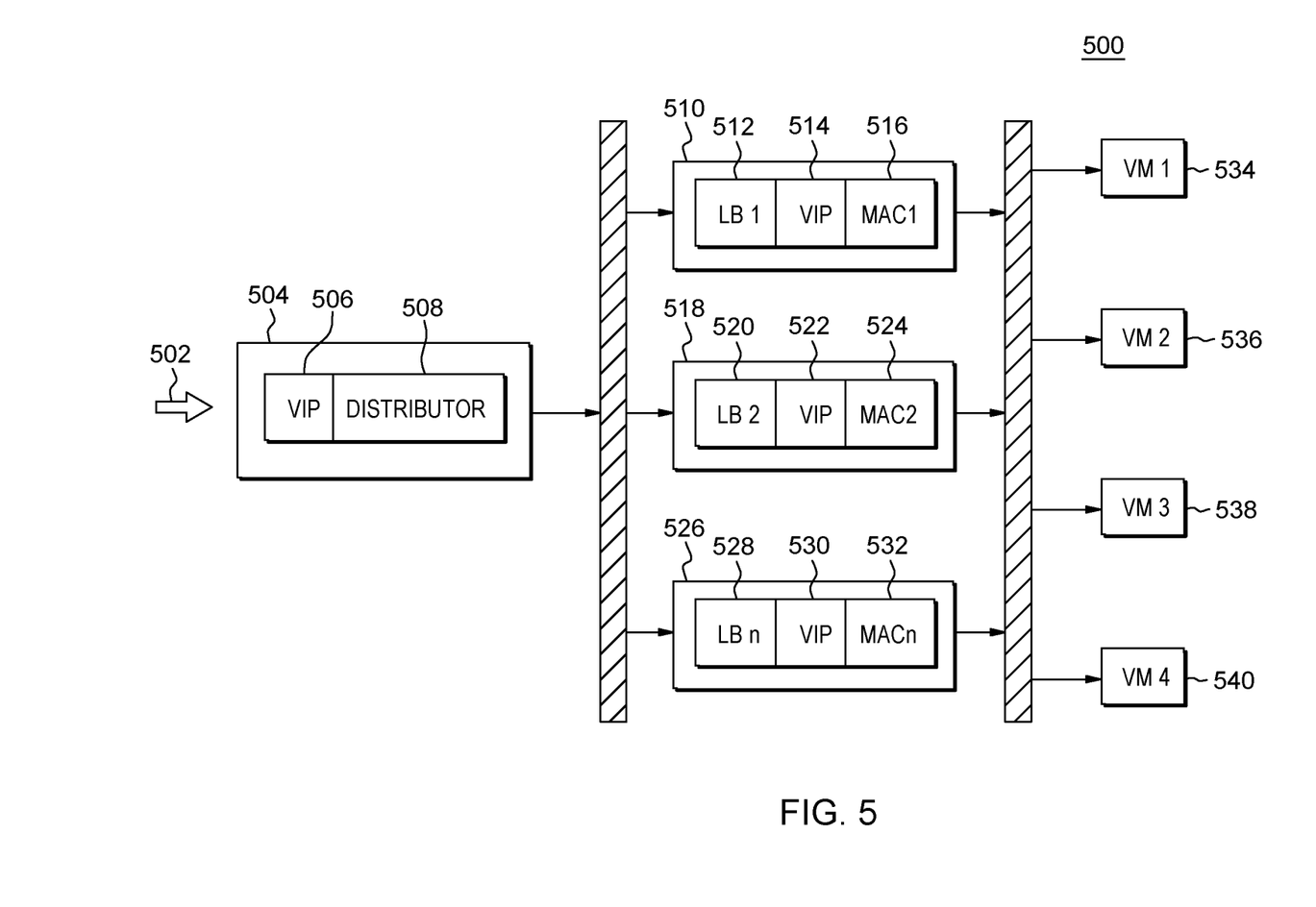
FIG. 5 is a diagram showing a load balancing scheme of a second embodiment system.

An embodiment of the present invention will now be discussed with reference to FIGS. 5 and 6. Diagram 500 of FIG. 5 shows a load balancing scheme according to some embodiments of the present invention, beginning with incoming traffic 502. In this example embodiment, four load balancers are shown (504, 510, 518 and 526), but this embodiment may be implemented with more than four load balancers or as few as two load balancers. In this example, each load balancer (504, 510, 518 and 526) is configured with the same virtual internet protocol (VIP) address, shown as 506, 514, 522 and 530, respectively.

One objective to be achieved by load balancing scheme 500 is optimizing distribution of incoming traffic (such as traffic 502) to two or more virtual machines through load balancing hardware. An effective way to distribute a high volume of incoming traffic, when a plurality of virtual machines are present for receiving traffic, is to distribute the incoming traffic amongst the plurality of virtual machines based on their respective capabilities and assigned traffic. This spreads out the incoming traffic such that one or a handful of virtual machines are not handling a high volume of traffic while many available virtual machines are idle.

Initially, load balancer 504 is elected as the distributor, also known as the master, from the group of four load balancers, and runs distributor module 508. A distributor is elected from among all available load balancers, based on a relative comparison among the active load balancers, of their respective capabilities and loads, with the active load balancer with the highest capability relative to its assigned load being elected as the distributor. The remaining load balancers (510, 518 and 526) are then set as active load balancers within load balancing scheme 500, and run load balancing modules 512, 520, and 528, respectively. Each active load balancer also has a media access control (MAC) address, individually identifying each device for layer 2 communications. Virtual Machines (VM) 534, 536, 538, and 540 are configured to receive segments of incoming traffic 502 from any active load balancer, such as load balancers 510, 518 and 526.

Incoming traffic 502 is initially addressed to the VIP address shared by all load balancers in load balancing scheme 500, shown as 506, 514, 522 and 530, which is received by elected distributor 504. Elected distributor 504 then determines which load balancer, from among the active load balancers (510, 518 and 526) should receive incoming traffic 502, for distribution among the VM (534, 536, 538 and 540), based on the relative capabilities of the load balancers. To forward the incoming traffic 502 to the active load balancers, the elected distributor 504 changes the destination MAC address for the incoming traffic 502 to the MAC address of one of the active load balancers, such as 516, 524, or 532. After an active load balancer receives incoming traffic 502, the active load balancer delivers the incoming traffic 502 to one of the VM (534, 536, 538 and 540).

Figure 6:
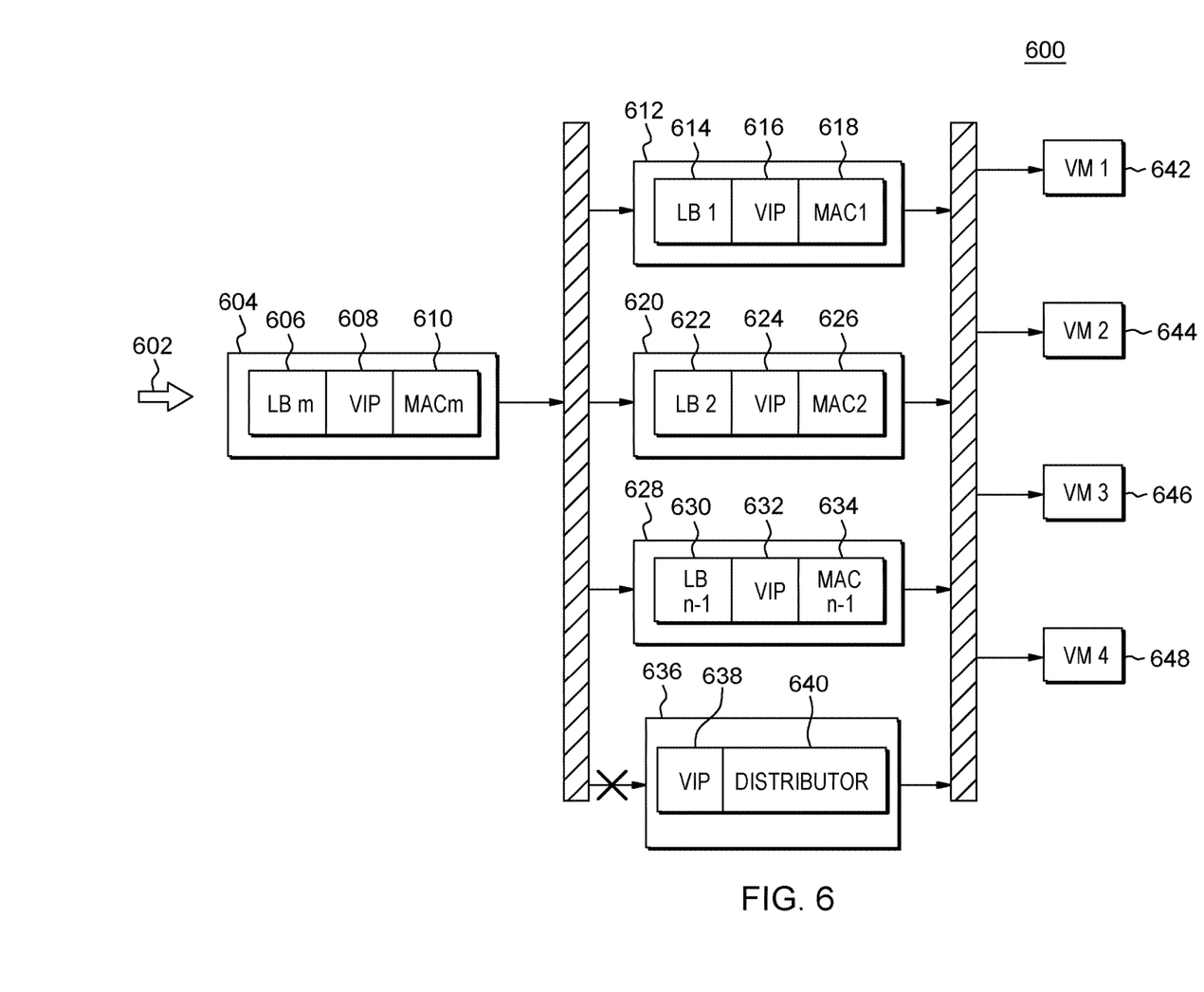
FIG. 6 is a diagram showing a distributor failure of a second embodiment system.

Diagram 600 of FIG. 6 shows one example of how a load balancing scheme, according to some embodiments of the present invention, handles the failure of a load balancer that was elected as the distributor for the load balancing scheme. Diagram 600 includes active load balancers 612 and 620, each with a load balancing module (614 and 622, respectively), a shared VIP (616 and 624, respectively), and a MAC address unique to each of them (618 and 626, respectively).

Diagram 600 also includes load balancer 628, acting as a representative of the remaining active load balancers in the load balancing scheme, excluding the above named load balancers as well as load balancer 604. Load balancer 628 includes a load balancing module 630, a shared VIP 632, and a unique MAC address 634. Diagram 600 further includes load balancer 604, which includes load balancer module 606, shared VIP 608, and a unique MAC address 610. Shown also is inactive load balancer 636, which includes shared VIP 638 and distributor module 640.

In this example embodiment, each active load balancer, such as 612 and 620, is configured to deliver incoming traffic, such as traffic 602, after said incoming traffic has been directed to the load balancer by an elected distributor. Previously, inactive load balancer 636 was the elected distributor, until it suffered a failure and was rendered inactive. When 636 went inactive, it ceased communicating to the remaining active load balancers that it is operational, triggering an election protocol by the remaining active load balancers. In this example embodiment, each active load balancer receives communications from the other active load balancers including information indicative of their respective capabilities and current loads. Active load balancers self-remove from consideration for the role of distributor if they receive information that another load balancer has a more favorable balance of capability and current load, until a load balancer is elected as distributor.

In this example, 604 is elected as the distributor and begins duties as the distributor, including forwarding incoming traffic 602, which was addressed to the shared VIP (shown as 608, 616, 624, and 632) to active load balancers 612, 620, and 628 based upon their unique MAC addresses (shown as 618, 626, and 634). Alternatively, load balancer 604, in its capacity as elected distributor, may also simultaneously operate as an active load balancer while performing distributor duties, in situations where it has available capabilities that are not presently being utilized by distributor duties. After a given active load balancer, such as 612, 620 or 628 receives incoming traffic 602, the given active load balancer delivers the incoming traffic 602 to one or more of the VM (642, 644, 646 or 648).

Figure 7:
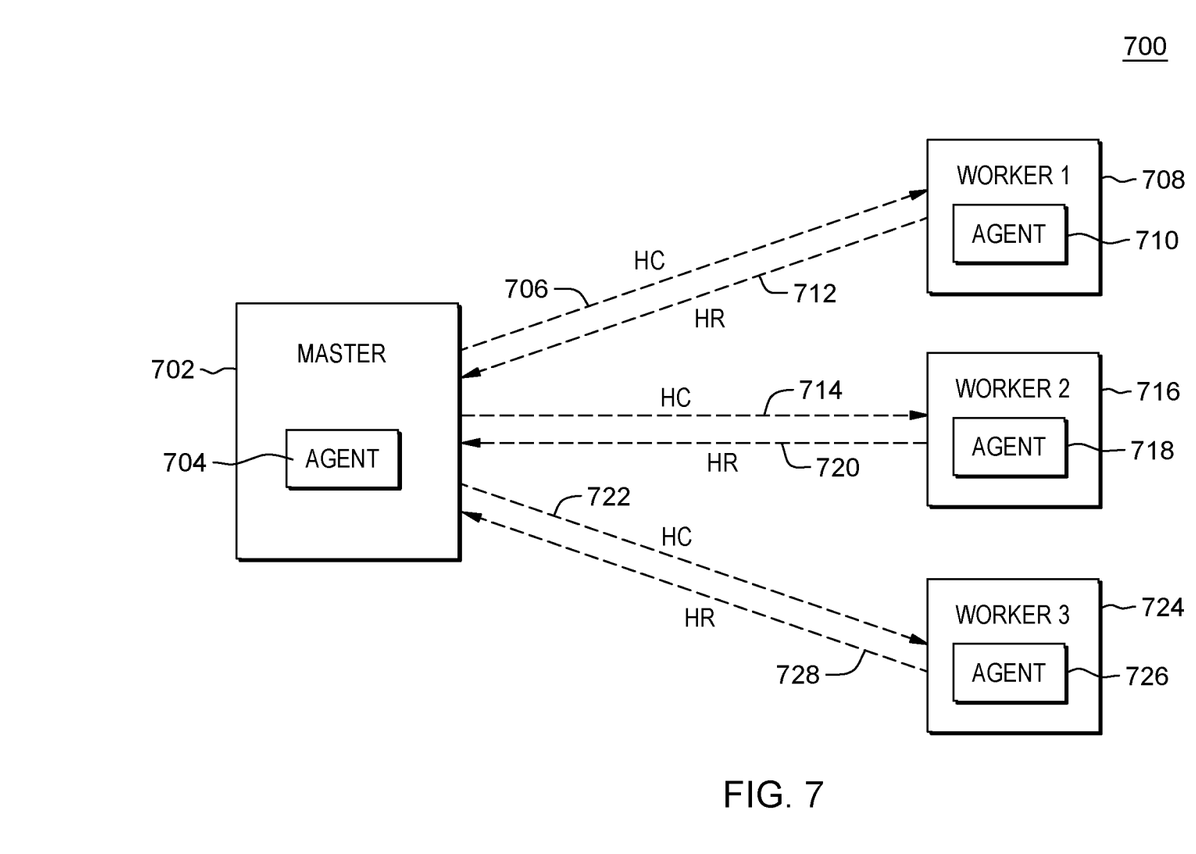
FIG. 7 is a diagram showing a master-worker load balancer scheme of a third embodiment system.

Diagram 700 of FIG. 7 shows a master-worker load balancing scheme according to some embodiments of the present invention. Included in this master-worker load balancing scheme is: Master 702 with agent module 704, Worker 1 708 with agent module 710, Worker 2 716 with agent module 718, and worker 3 724 with agent module 726. Also shown are Heartbeat Checks (HC) 706, 714 and 722, broadcasted from Master 702 to Worker 1 708, Worker 2 716 and Worker 3 724, respectively, as well as Heartbeat Responses (HR) 712, 720, and 728, communicated to Master 702 from Worker 1 708, Worker 2 716 and Worker 3 724, respectively. These embodiments of the present invention may be implemented with more than three workers and one master or as few as one worker and one master.

In this example embodiment, Master 702 is a load balancer that was elected from a plurality of load balancers available to the master-worker load balancing scheme 700. Periodically, master 702 broadcasts HC to each worker (708, 716 and 724). This HC can be configured to perform a number of operations, some examples of which include: (i) broadcasting updated configuration settings for all load balancers part of the scheme; (ii) broadcasting the capabilities and current loads of each worker to each other worker; and (iii) indicating to each worker that the master is still operational. Upon receiving a HC, each worker (708, 716 and 724) returns a HR to master 702. This HR may include some or all of the following types of information about the worker: (i) capabilities of the worker; (ii) current load of the worker; and (iii) status of the worker as active or inactive.

According to some embodiments of the present invention, if the workers (708, 716, and 724) do not receive HC from a master, such as master 702, they begin to chatter amongst the workers to identify and elect a new master, which then begins broadcasting the HC anew. If a worker does not respond to HC with a HR, it is marked as inactive. A master can attempt to activate previously inactive workers with an activation message, or deactivate other workers with deactivation messages.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A load balancer computer system (LBCS) for performing load balancing operations in conjunction with a plurality of web client devices and a plurality of hypertext transfer protocol (HTTP) servers, the load balancer computer system comprising:
    a plurality of non-initial distributor role load balancer machines (LBMs);
    an initial distributor role LBM;
    a distributor fail detection module structured, programmed and/or connected in data communication to detect a failure in the initial distributor role LBM; and
    a new distributor role assignment module structured, programmed and/or connected in data communication to, responsive to the detection of the failure in the initial distributor role LBM, assign a first non-initial distributor role LBM of the plurality of non-initial distributor role LBMs to act in the distributor role on a going forward basis;
    wherein:
    the initial distributor role LBM includes: (i) a distributor module, and (ii) a load balancer module;
    each load balancer machine of the plurality of non-initial distributor role LBMs includes: (i) a distributor module, and (ii) a load balancer module;
    the initial distributor role LBM is assigned: (i) a common logical network address, and (ii) a unique logical network address;
    each load balancer machine of the plurality of non-initial distributor role LBMs is assigned: (i) a common logical network address, and (ii) a unique logical network address;
    the distributor module of the initial distributor role LBM is structured, programmed and/or connected in data communication to receive, at the common logical network address, a plurality of web client communications from the plurality of web client devices over a communication network;
    the distributor module of each load balancer machine of the plurality of non-initial distributor role LBMs is structured, programmed and/or connected in data communication to receive, at the common logical network address, the plurality of web client communications from the plurality of web client devices over the communication network;
    the distributor module of the initial distributor role LBM is further structured, programmed and/or connected in data communication to, as part of its assigned distributor role, distribute each given web client communication of the plurality of web client communications to one of the following: (i) the load balancer module of the initial distributor role LBM, or (ii) the load balancer module of one of the non-initial distributor role LBMs using the unique logical network address associated with that non-initial distributor LBM; and
    the load balancer module of the initial distributor LBM and the load balancer modules of the non-initial distributor LBMs are structured, programmed and/or connected to perform load balancing with respect to the plurality of web client communications distributed by the distributor module of the initial distributor LBM and the plurality of HTTP servers.

2. The LBCS of claim 1 wherein the distributor module of each load balancer machine of the plurality of non-initial distributor role LBMs is further structured, programmed and/or connected in data communication to temporarily save the plurality of web client communications from the plurality of web client devices over the communication network to provide for seamless failover when the first non-initial distributor role LBM of the plurality of non-initial distributor role LBMs is assigned to act in the distributor role.

3. The LBCS of claim 2 wherein each LBM of the plurality of LBMs is a separate physical machine and does not include a virtual machine.

4. The LBCS of claim 2 wherein:
    the distributor fail detection module is located in one, or more, of the LBM(s) of the plurality of LBMs; and
    the new distributor role assignment module is located in one, or more, of the LBM(s) of the plurality of LBMs.

5. The LBCS of claim 2 wherein the common logical network address is a virtual internet protocol (VIP) address that communicates at level 3 and/or level 4.

6. The LBCS of claim 2 wherein the unique logical network addresses are media access control (MAC) addresses that communicate at level 2.

7. A computer-implemented method (CIM) comprising:
assigning a common logical network address to a plurality of load balancer machines (LBM) of a load balancer system;
for each given LBM of the plurality of LBMs, assigning a unique logical network address to the given LBM;
assigning a first LBM of the plurality of LBMs to a distributor role such that the LBMs of the plurality of LBMs other than the first LBM take on a non-distributor role;
receiving, by the load balancer system, from a plurality of web client devices and over a communication network, a plurality of incoming web client communications, with the receipt of the plurality of incoming web client communications including:
  receiving, by the first LBM and at the common logical network address, the plurality of incoming web client communications,
  receiving, by the non-distributor role LBMs and at the common logical network address, the plurality of incoming web client communications, and
  at least temporarily saving, by the non-distributor role LBMs the plurality of incoming web client communications;
distributing, by the first LBM, some of the incoming the plurality of incoming web client communications using the unique logical network addresses respectively corresponding to the non-distributor role LBMs, with the incoming web client communications of the plurality of incoming web client communications that are not distributed forming a plurality of not-yet-distributed communications;
determining that the first LBM has failed; and
responsive to the determination that the first LBM has failed, assigning a second LBM of the plurality of LBMs to the distributor role such that the LBMs of the plurality of LBMs other than the first and second LBMs maintain their respective non-distributor roles.

8. The CIM of claim 7 further comprising:
performing seamless failover of the distributor role from the first LBM to the second LBM using the temporarily stored not-yet-distributed plurality of incoming web client communications that have been temporarily saved by the second LBM.

9. The CIM of claim 8 wherein each LBM of the plurality of LBMs is a separate physical machine and does not include a virtual machine.

10. The CIM of claim 8 wherein the assignment of the second LBM of the plurality of LBMs to the distributor role is based, at least in part, upon both of the following factors: capacity and current load.

11. The CIM of claim 8 wherein the common logical network address is a virtual internet protocol (VIP) address that communicates at level 3 and/or level 4.

12. The CIM of claim 8 wherein the unique logical network addresses are media access control (MAC) addresses that communicate at level 2.

13. The CIM of claim 8 wherein:
the common logical network address is a virtual internet protocol (VIP) address that communicates at level 3 and/or level 4; and
the unique logical network addresses are media access control (MAC) addresses that communicate at level 2.

14. A computer program product (CPP) comprising:
a computer readable storage medium; and
computer code stored on the storage medium, with the computer code including data and instructions for causing a processor(s) set to perform at least the following operations:
  assigning a common logical network address to a plurality of load balancer machines (LBM) of a load balancer system;
  for each given LBM of the plurality of LBMs, assigning a unique logical network address to the given LBM;
  assigning a first LBM of the plurality of LBMs to a distributor role such that the LBMs of the plurality of LBMs other than the first LBM take on a non-distributor role;
  receiving, by the load balancer system, from a plurality of web client devices and over a communication network, a plurality of incoming web client communications, with the receipt of the plurality of incoming web client communications including:
    receiving, by the first LBM and at the common logical network address,
    the plurality of incoming web client communications,
    receiving, by the non-distributor role LBMs and at the common logical network address, the plurality of incoming web client communications, and
    at least temporarily saving, by the non-distributor role LBMs the plurality of incoming web client communications;
  distributing, by the first LBM, some of the incoming the plurality of incoming web client communications using the unique logical network addresses respectively corresponding to the non-distributor role LBMs, with the incoming web client communications of the plurality of incoming web client communications that are not distributed forming a plurality of not-yet-distributed communications;
  determining that the first LBM has failed; and
  responsive to the determination that the first LBM has failed, assigning a second LBM of the plurality of LBMs to the distributor role such that the LBMs of the plurality of LBMs other than the first and second LBMs maintain their respective non-distributor roles.

15. The CPP of claim 14 wherein the computer code further comprises data and instructions for causing the processor(s) set to perform the following operation(s):
performing seamless failover of the distributor role from the first LBM to the second LBM using the temporarily stored not-yet-distributed plurality of incoming web client communications that have been temporarily saved by the second LBM.

16. The CPP of claim 15 wherein each LBM of the plurality of LBMs is a separate physical machine and does not include a virtual machine.

17. The CPP of claim 15 wherein the assignment of the second LBM of the plurality of LBMs to the distributor role is based, at least in part, upon both of the following factors: capacity and current load.

18. The CPP of claim 15 wherein the common logical network address is a virtual internet protocol (VIP) address that communicates at level 3 and/or level 4.

19. The CPP of claim 15 wherein the unique logical network addresses are media access control (MAC) addresses that communicate at level 2.

20. The CPP of claim 15 further comprising the processor(s) set, wherein:
 the CPP is in the form of a computer system (CS).

* * * * *